(12) United States Patent
Balcom et al.

(10) Patent No.: US 11,835,666 B1
(45) Date of Patent: Dec. 5, 2023

(54) PHOTON COUNTING COMPUTED TOMOGRAPHY DETECTOR WITH IMPROVED COUNT RATE STABILITY AND METHOD OF OPERATING SAME

(71) Applicant: REDLEN TECHNOLOGIES, INC., Saanichton (CA)

(72) Inventors: James Balcom, North Saanich (CA); Krzysztof Iniewski, Port Moody (CA); Elmaddin Guliyev, Vancouver (CA)

(73) Assignee: REDLEN TECHNOLOGIES, INC., Saanichton (CA)

( * ) Notice: Subject to any disclaimer, the term of this patent is extended or adjusted under 35 U.S.C. 154(b) by 139 days.

(21) Appl. No.: 17/390,426

(22) Filed: Jul. 30, 2021

Related U.S. Application Data

(60) Provisional application No. 63/059,492, filed on Jul. 31, 2020.

(51) Int. Cl.
*G01T 1/24* (2006.01)
*G01N 23/046* (2018.01)

(52) U.S. Cl.
CPC .............. *G01T 1/241* (2013.01); *G01T 1/247* (2013.01); *G01N 23/046* (2013.01)

(58) Field of Classification Search
CPC ........ G01T 1/241; G01T 1/247; G01N 23/046
See application file for complete search history.

(56) References Cited

U.S. PATENT DOCUMENTS

| 5,677,539 | A | * | 10/1997 | Apotovsky | ....... H01L 27/14676 257/E27.146 |
|---|---|---|---|---|---|
| 6,037,595 | A | * | 3/2000 | Lingren | .................. G01T 1/241 250/370.01 |
| 6,043,495 | A | * | 3/2000 | Verger | ................... H01L 31/115 257/E31.086 |
| 6,069,360 | A | * | 5/2000 | Lund | .................... H01L 31/0296 250/370.06 |
| 6,169,287 | B1 | * | 1/2001 | Warburton | .............. G01T 1/247 250/370.1 |
| 6,175,120 | B1 | * | 1/2001 | McGregor | ................ G01T 1/24 250/370.06 |
| 6,285,029 | B1 | * | 9/2001 | Shahar | .................... G01T 1/249 250/370.1 |
| 6,455,858 | B1 | * | 9/2002 | Patt | ....................... H01L 31/115 257/E27.128 |
| 9,202,961 | B2 | | 12/2015 | Chen et al. | |

(Continued)

OTHER PUBLICATIONS

Fink, J. et al., Nuclear Instruments and Methods in Physics Research A 560 (2006) 435-443 (Year: 2006).*

(Continued)

*Primary Examiner* — Blake C Riddick
(74) *Attorney, Agent, or Firm* — THE MARBURY LAW GROUP PLLC

(57) ABSTRACT

An X-ray radiation detector includes a semiconductor material plate, at least one cathode located on a first side of the semiconductor material plate, and at least one anode located on a second side of the semiconductor material plate. The semiconductor material plate thickness is at least 1.9 mm. The X-ray radiation detector is configured to operate at an absolute value of applied bias voltage of 1050 VDC to 1500 VDC, such that an electric field of at least 550 VDC/mm is generated in the semiconductor material plate.

17 Claims, 7 Drawing Sheets

(56) References Cited

U.S. PATENT DOCUMENTS

| | | | |
|---|---|---|---|
| 9,847,369 B2 | 12/2017 | El-Hanany et al. | |
| 10,203,420 B2 | 2/2019 | Lu et al. | |
| 10,393,891 B2 | 8/2019 | Iniewski et al. | |
| 10,396,109 B2 | 8/2019 | Iniewski et al. | |
| 2001/0024484 A1* | 9/2001 | Francke | G01N 23/04 378/62 |
| 2002/0079456 A1* | 6/2002 | Lingren | H01L 27/14676 250/370.01 |
| 2003/0085358 A1* | 5/2003 | El-Hanany | G01T 1/249 250/370.13 |
| 2005/0167600 A1* | 8/2005 | Amemiya | G01T 1/2928 250/363.05 |
| 2005/0230630 A1* | 10/2005 | Yanagita | G01T 1/2928 250/370.09 |
| 2007/0003006 A1* | 1/2007 | Tkaczyk | G01T 1/242 378/19 |
| 2007/0111358 A1* | 5/2007 | Seino | G01T 1/249 438/48 |
| 2009/0065701 A1* | 3/2009 | Bale | G01T 1/24 250/370.09 |
| 2009/0108208 A1* | 4/2009 | Yanagita | G01T 1/2985 250/370.01 |
| 2009/0129538 A1* | 5/2009 | Tkaczyk | G01T 1/249 250/361 R |
| 2012/0193545 A1* | 8/2012 | Tkaczyk | G01T 1/244 250/370.08 |
| 2012/0313196 A1* | 12/2012 | Li | H01L 31/03529 257/E31.124 |
| 2013/0266114 A1* | 10/2013 | Chen | G01T 1/241 250/371 |
| 2014/0209809 A1* | 7/2014 | Zhang | G01T 1/241 250/370.12 |
| 2014/0284489 A1* | 9/2014 | Engel | H01L 27/14665 250/370.09 |
| 2014/0319363 A1* | 10/2014 | Engel | G01T 1/24 257/428 |
| 2015/0268356 A1* | 9/2015 | Kominami | A61B 6/037 250/370.08 |
| 2015/0323686 A1* | 11/2015 | Rostaing | G01T 1/247 250/370.1 |
| 2016/0126402 A1* | 5/2016 | Shahar | H01L 31/1832 438/98 |
| 2016/0240584 A1 | 8/2016 | El-Hanany et al. | |
| 2016/0313454 A1* | 10/2016 | Rodrigues | G01T 1/247 |
| 2017/0290555 A1 | 10/2017 | Iniewski et al. | |
| 2017/0322319 A1 | 11/2017 | Iniewski et al. | |
| 2017/0323923 A1* | 11/2017 | Choi | H01L 31/02161 |
| 2018/0024254 A1* | 1/2018 | Roy | G01T 1/241 250/370.12 |
| 2018/0329079 A1 | 11/2018 | Lu et al. | |
| 2018/0356541 A1* | 12/2018 | Steadman Booker | G01T 1/2018 |
| 2020/0150297 A1 | 5/2020 | Iniewski et al. | |
| 2020/0367839 A1 | 11/2020 | Iniewski et al. | |
| 2020/0393576 A1 | 12/2020 | Harris et al. | |
| 2021/0022695 A1 | 1/2021 | Iniewski et al. | |
| 2021/0063589 A1 | 3/2021 | Iniewski et al. | |
| 2022/0155471 A1* | 5/2022 | Blevis | G01T 1/2964 |
| 2022/0262844 A1* | 8/2022 | Bakowski Holtryd | H01L 27/14658 |

OTHER PUBLICATIONS

Bale, D.S. et al., "Nature of polarization in wide-bandgap semiconductor detectors under high-flux irradiation: Application to semi-insulating Cd1—xZnxTe" Physical Review B 77, 035205 (2008) DOI: 10.1103/PhysRevB.77.035205.

Ballabriga, R. et al., "Review of hybrid pixel detector readout ASICs for spectroscopic X-ray imaging" JINST, vol. 11 P01007, (2016) DOI:10.1088/1748-0221/11/01/P01007.

Strassburg, M et al., "Characteristics of CdTe/CZT under High Flux Irradiation," Journal of Instrumentation, vol. 6, Jan. 2011, C01055.

Kappler, S. "First results from a hybrid prototype CT scanner for exploring benefits of quantum-counting in clinical CT," Proc. of SPIE, vol. 8313, 83130X-1, (2015) Downloaded From: http://proceedings.spiedigitallibrary.org/ on Jan. 9, 2015 Terms of Use: http://spiedl.org/terms.

Muenzel, D. et al., "Spectral Photon-counting CT: Initial Experience with Dual-Contrast Agent K-Edge Colonography," Radiology, vol. 283, No. 3, pp. 723-728, (2017) DOI: 10.1148/radiol. 2016160890, Epub Dec. 2, 2016.

Prekas, G. et al., "Recent Advancements in CdZnTe Sensors Development for High-Flux Photon Counting Based Applications," Workshop on Medical Applications of Spectroscopic X-Ray Detectors, CERN, May 13-16, 2019.

K. Iniewski, C. Hansson, E. Guliyev, G. Prekas and M. Ayukawa, "Performance Characteristics of 250+ Mcps/mm2 CZT Detector Module for Spectral Computed Tomography," in 5th Workshop on Medical Applications of Spectroscopic X-ray Detectors, CERN, Geneva, 2019.

U.S. Appl. No. 17/064,089, filed Oct. 6, 2020, Redlen Techonologies, Inc.

U.S. Appl. No. 17/225,416, filed Apr. 8, 2021, Redlen Techonologies, Inc.

* cited by examiner

US 11,835,666 B1

PHOTON COUNTING COMPUTED TOMOGRAPHY DETECTOR WITH IMPROVED COUNT RATE STABILITY AND METHOD OF OPERATING SAME

FIELD

The present application relates generally to radiation detectors for X-ray imaging systems, and to photon counting computed tomography (PCCT) imaging systems in particular.

BACKGROUND

In typical photon counting X-ray computed tomography (CT) imaging systems currently in use, the charge cloud resulting from an X-ray photon impinging on a sensor is converted to an amplified voltage by a charge sensitive amplifier (CSA). The voltage output of the CSA is compared against a number of user-settable thresholds. Each threshold level is associated with a counter, such that each counter represents an energy bin representing the energy range between two adjacent thresholds. However, such PCCT systems still suffer from poor count rate stability.

SUMMARY

According to one embodiment, an X-ray radiation detector includes a semiconductor material plate, at least one cathode located on a first side of the semiconductor material plate, and at least one anode located on a second side of the semiconductor material plate. The semiconductor material plate thickness is at least 1.9 mm. The X-ray radiation detector is configured to operate at an absolute value of applied bias voltage of 1050 VDC to 1500 VDC, such that an electric field of at least 550 VDC/mm is generated in the semiconductor material plate.

According to another embodiment, a photon counting computed tomography imaging system contains an X-ray source and an X-ray radiation detector which comprises a semiconductor material plate having a thickness of at least 1.9 mm, at least one cathode located on a first side of the semiconductor material plate, and at least one anode located on a second side of the semiconductor material plate. The method of operating the system comprises applying an absolute value of applied bias voltage of 1050 VDC to 1500 VDC to the X-ray radiation detector, such that an electric field of at least 550 VDC/mm is generated in the semiconductor material plate.

BRIEF DESCRIPTION OF THE DRAWINGS

The accompanying drawings are presented to aid in the description of embodiments of the disclosure and are provided solely for illustration of the embodiments and not limitation thereof.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims. Any reference to claim elements in the singular, for example, using the articles "a," "an," or "the" is not to be construed as limiting the element to the singular. The terms "example," "exemplary," or any term of the like are used herein to mean serving as an example, instance, or illustration. Any implementation described herein as an "example" is not necessarily to be construed as preferred or advantageous over another implementation. The drawings are not drawn to scale. Multiple instances of an element may be duplicated where a single instance of the element is illustrated, unless absence of duplication of elements is expressly described or clearly indicated otherwise.

Figure 1:
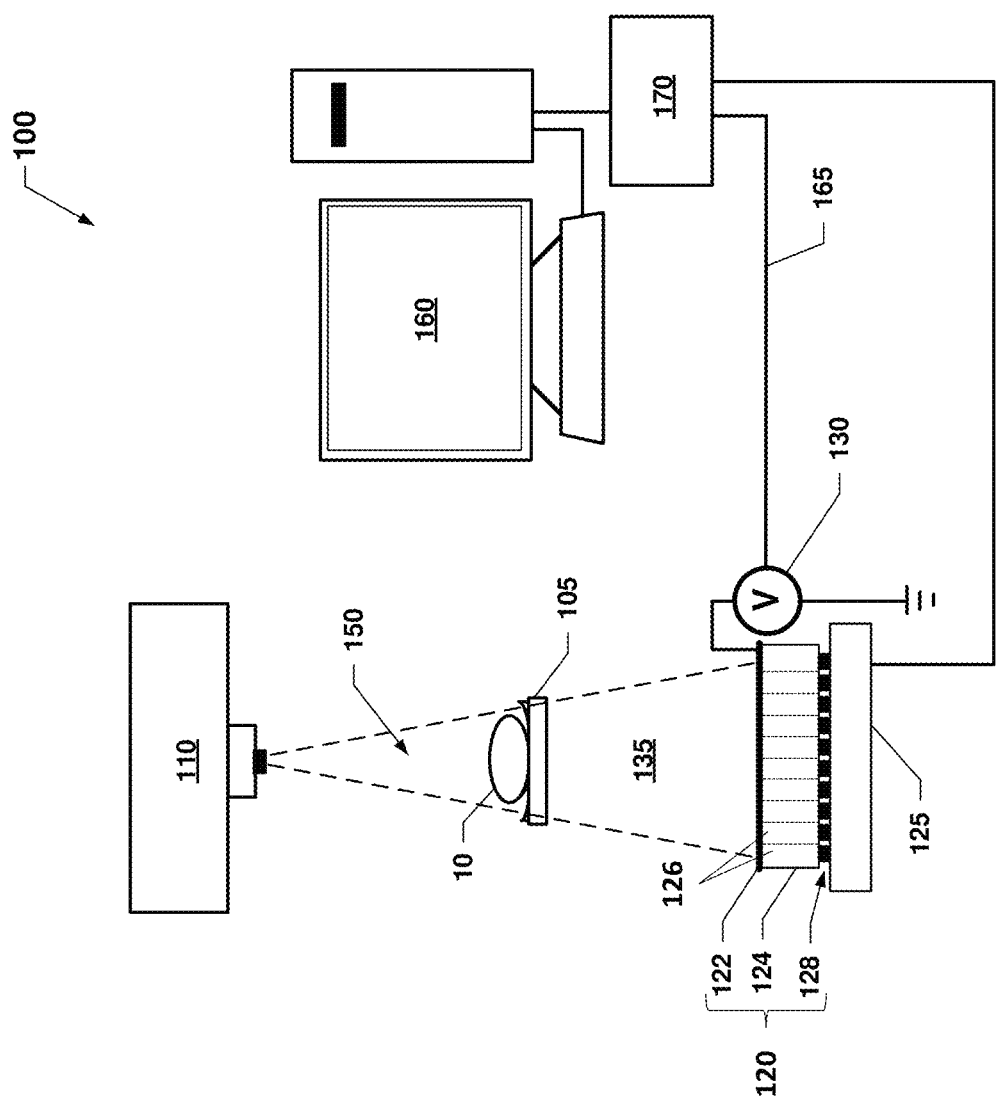
FIG. 1 is a block diagram of an X-ray imaging system suitable for use with various embodiments of the present disclosure.

FIG. 1 is a functional block diagram of an example ionizing radiation imaging system in accordance with various embodiments. The illustrated example ionizing radiation imaging system is a CT imaging system 100 that includes an X-ray source 110 (i.e., a source of ionizing radiation), and a radiation detector 120. The CT imaging system 100 may additionally include a support structure 105, such as a table or frame, which may rest on the floor and may support an object 10 to be scanned. The support structure 105 may be stationary (i.e., non-moving) or may be configured to move relative to other elements of the CT imaging system 100. The object 10 may be all or a portion of any biological (e.g., human patient) or non-biological (e.g., luggage) object to be scanned.

The X-ray source 110 is configured to deliver ionizing radiation to the radiation detector 120 by emitting an X-ray beam 135 toward the object 10 and the radiation detector 120. After the X-ray beam 135 is attenuated by the object 10, the beam of radiation 135 is received by the radiation detector 120. The radiation detector 120 includes at least one anode 128 and cathode 122 pair separated by a semiconductor material plate 124.

The radiation detector 120 may be controlled by a high voltage bias power supply 130 that selectively creates an electric field between an anode 128 and cathode 122 pair separated by a semiconductor material plate 124. The semiconductor material plate 124 may comprise any suitable X-ray semiconductor material, such as cadmium zinc telluride (i.e., "CdZnTe" or "CZT") or another material, disposed between the anode 128 and cathode 122 and thus configured to be exposed to the electrical field therebetween. For example, there may be a plurality of separate CZT pixels 126 (e.g., 4 to 1024, such as 256 to 864 pixels for example) in the semiconductor material plate 124, each containing and electrically connected to a separate anode 128. One or more cathodes 122 are provided for the plurality of CZT pixels 126. A read-out application specific integrated circuit (ASIC) 125 coupled to the anode(s) 128 and cathode 122 pair may receive signals (e.g., charge or current) from the anode(s) 128 and be configured to provide data to and by controlled by a control unit 170.

The control unit 170 may be configured to synchronize the X-ray source 110, the read-out ASIC 125, and the high voltage bias power supply 130. The control unit 170 may be coupled to and operated from a computing device 160. Alternatively, the computing device 160 and the control unit 170 may be integrated together as one device.

The object 10 may pass between the X-ray source 110 and the radiation detector 120 or alternatively the object may remain stationary while the X-ray source 110 and the radiation detector 120 move relative to the object 10. Either way, the radiation detector 120 may capture incremental cross-sectional profiles of the object 10. The data acquired by the radiation detector 120 may be passed along to the computing device 160 that may be located remotely from the radiation detector 120 via a connection 165. The connection 165 may be any type of wired or wireless connection. If the connection 165 is a wired connection, the connection 165 may include a slip ring electrical connection between any structure supporting the radiation detector 120 and a stationary support part of the support structure 105, which supports any part (e.g., a rotating ring). If the connection 165 is a wireless connection, the radiation detector 120 may contain any suitable wireless transceiver to communicate data with another wireless transceiver that is in communication with the computing device 160. The computing device 160 may include processing and imaging applications that analyze each profile obtained by the radiation detector 120, and a full set of profiles may be compiled to form two-dimensional images of cross-sectional slices of the object 10.

Various alternatives to the design of the CT imaging system 100 of FIG. 1 may be employed to practice embodiments of the present disclosure. CT imaging systems may be designed in various architectures and configurations. For example, a CT imaging system may have a helical architecture. In a helical CT imaging scanner, the X-ray source and detector array are attached to a freely rotating gantry. During a scan, a table (i.e., support structure 105) moves the object 10 smoothly through the scanner creating helical path traced out by the X-ray beam. Slip rings enable the transfer of power and data on and off the rotating gantry. In other embodiments, the CT imaging system may be a tomosynthesis CT imaging system. In a tomosynthesis CT scanner, the gantry may move in a limited rotation angle (e.g., between 15 degrees and 60 degrees) in order to detect a cross-sectional slice of the object. The tomosynthesis CT scanner may be able to acquire slices at different depths and with different thicknesses that may be constructed via image processing.

The detector array of a CT imaging system may include an array of radiation detector elements, referred to herein as pixel detectors. The signals from the pixel detectors may be processed by a pixel detector circuit, which may sort detected photons into energy bins based on the energy of each photon or the voltage generated by the received photon. When an X-ray photon is detected, its energy is determined and the X-ray photon count for its associated energy bin is incremented. For example, if the detected energy of an X-ray photon is 24 kilo-electron-volts (keV), the X-ray photon count for the energy bin of 20-40 keV may be incremented. The number of energy bins may range from one to several, such as two to six. In an illustrative example, an X-ray photon counting detector may have four energy bins: a first bin for detecting photons having an energy between 20 keV and 40 keV, a second bin for detecting photons having an energy between 40 keV and 60 keV, a third bin for detecting photons having an energy between 60 keV and 80 keV, and a fourth bin for detecting photons having an energy above 80 keV. The greater the total number of energy bins, the better the material discrimination.

In CT imaging systems, a scanned object is exposed to an X-ray beam and attenuated photons from the X-ray beam are detected and counted by individual radiation detector pixels in a detector array. When an object (e.g., the object 10) is loaded in a CT imaging system, the X-ray beam may be heavily attenuated, and the number of photons detected by the detector array may be orders of magnitude less than the number of photons emitted from an X-ray source. For image reconstruction purposes, the radiation detector can be exposed to a direct X-ray beam without an intervening object located inside the CT imaging system. In such cases, the X-ray photon count rates in the CT imaging system may reach values of 100 million counts per second per square millimeter (Mcps/mm$^2$) or more. The detector array should be capable of detecting such a wide range of photon count rates.

Figure 2:
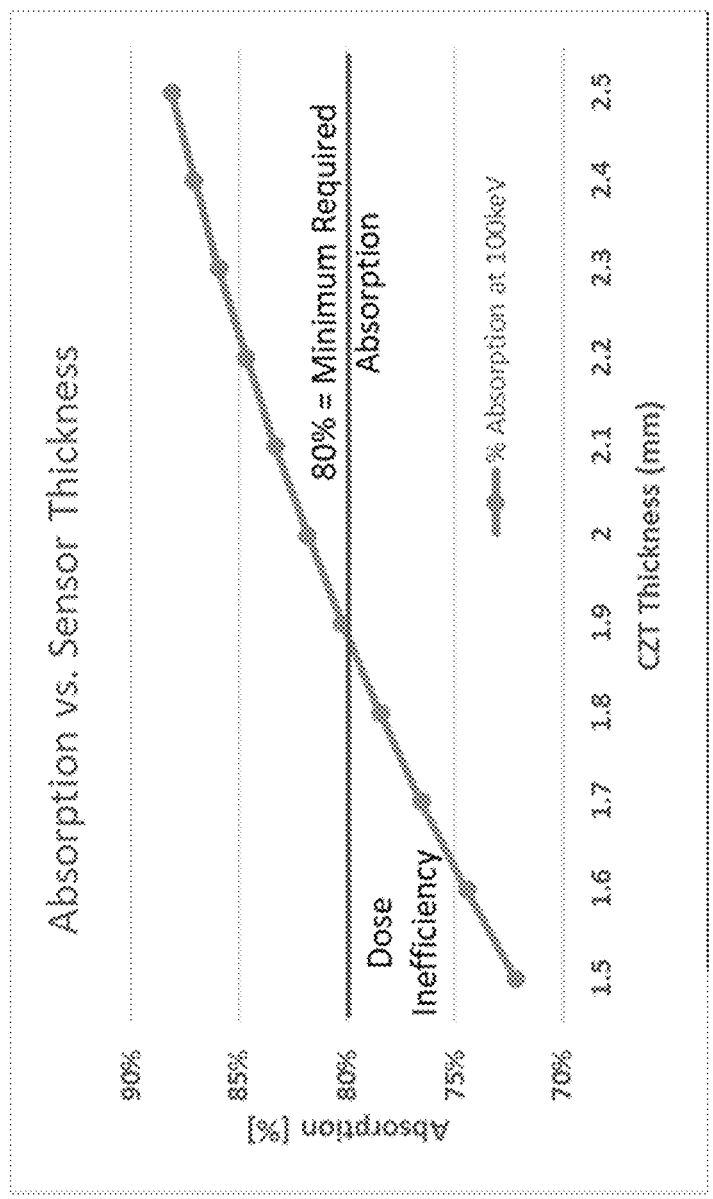
FIG. 2 is a plot of percent absorption versus CZT plate thickness according to various embodiments of the present disclosure.

The following three photon counting computed tomography (PCCT) detector parameters are typically designed to obtain a desired detector performance. First, the semiconductor material plate 124 thickness should be thick enough to achieve a sufficient X-ray absorption efficiency and maintain sufficient image quality, to prevent unnecessary X-ray exposure to the object (e.g., patient) 10 being imaged and to protect the ASIC 125 from X-ray radiation damage. As shown in FIG. 2, typically at least 80 percent absorption is desired to avoid having to increase the X-ray dose to compensate for a low X-ray absorption. For semiconductor X-ray detectors, such as cadmium telluride based detectors (e.g., CdTe or CZT detectors) 120, a semiconductor material plate 124 thickness of at least 1.9 mm is required to obtain at least 80 percent absorption of a typical 100 keV X-ray photon. Thus, the CZT detector 120 semiconductor material plate 124 thickness is preferably 1.9 mm to 3 mm.

Prior art systems using semiconductor detectors 120 with semiconductor material plates that are less than 1.9 mm thick typically require a second detector for higher energy photons. For example one prior art PCCT detector utilizes 1.6 mm thick CdTe plate as the sensor material. See S. Kappler, T. Hannermann, E. Kraft, B. Kreisler, D. Niederloehner, K. Stierstorfer, and T. Flohr "First results from a hybrid prototype CT scanner for exploring benefits of quantum-counting in clinical CT", Proc. SPIE 8313, Medical Imaging 2012: Physics of Medical Imaging, 83130X (2 Mar. 2012); https://doi.org/10.1117/12.911295. The present inventors believe that absorption efficiency of a 100 keV photon is only 74% at that thickness, compared to 82% for a 2.0 mm thicknesses. This would represent a requirement for an increased dosage of −10% to achieve the same image quality. Dosage reduction is an important concern in the medical imaging community, consequently the detection spectrum of the prior art system is limited to only 80 keV and below for the photon counting CdTe Detector. The prior art system thus requires a second x-ray tube and a separate ceramic GOS x-ray detector to detect energies above 80 keV. This increases the cost and complexity of the prior art system.

Second, the bias voltage applied to the detector 120 by the high voltage bias power supply 130 must not exceed the IEC 60601 limit of 1500 VDC. As used herein absolute voltage values are used. The actual voltage values may be either positive or negative depending on which electrode(s) are connected to the high voltage bias power supply 130. For example, for system in which the high voltage bias power supply 130 is connected to the cathode 122, the voltage is referred to as a negative voltage by convention. Thus, a bias voltage of negative 1500 VDC or less should be applied to the cathode 122 of the detector 120.

Third, the electric field applied to the detector 120 should be sufficiently high (i.e., strong enough) to deliver sufficient count rate performance, and to prevent polarization and ballistic deficit. The electric field is typically calculated by dividing the applied voltage by the detector 120 semiconductor material plate 124 thickness.

However, the present inventors have determined that the count rate stability of the prior art PCCT detectors is still lower than desired, despite having a sufficient semiconductor material plate thickness, applied voltage of not higher than 1500 VDC and a strong enough electric field to deliver sufficient count rate performance and avoid polarization and ballistic deficit.

Figure 3A:
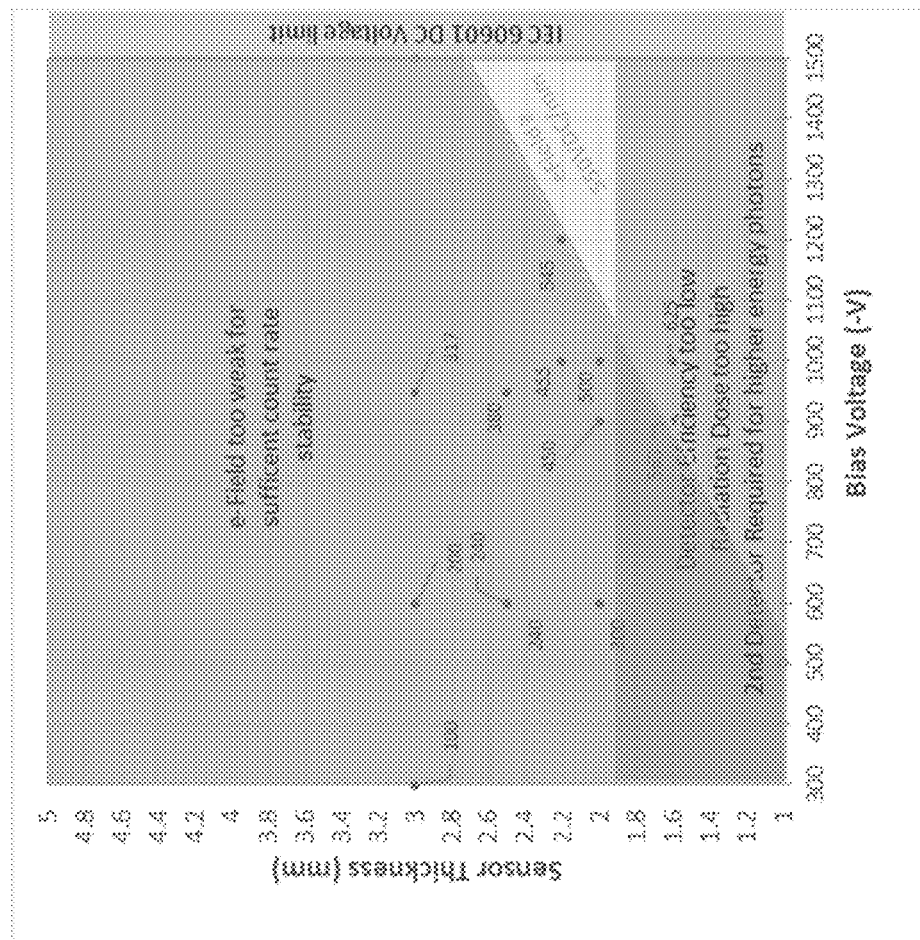
FIGS. 3A and 3B are plots of CZT sensor plate thickness versus applied bias voltage according to various embodiments of the present disclosure.
Figure 3B:
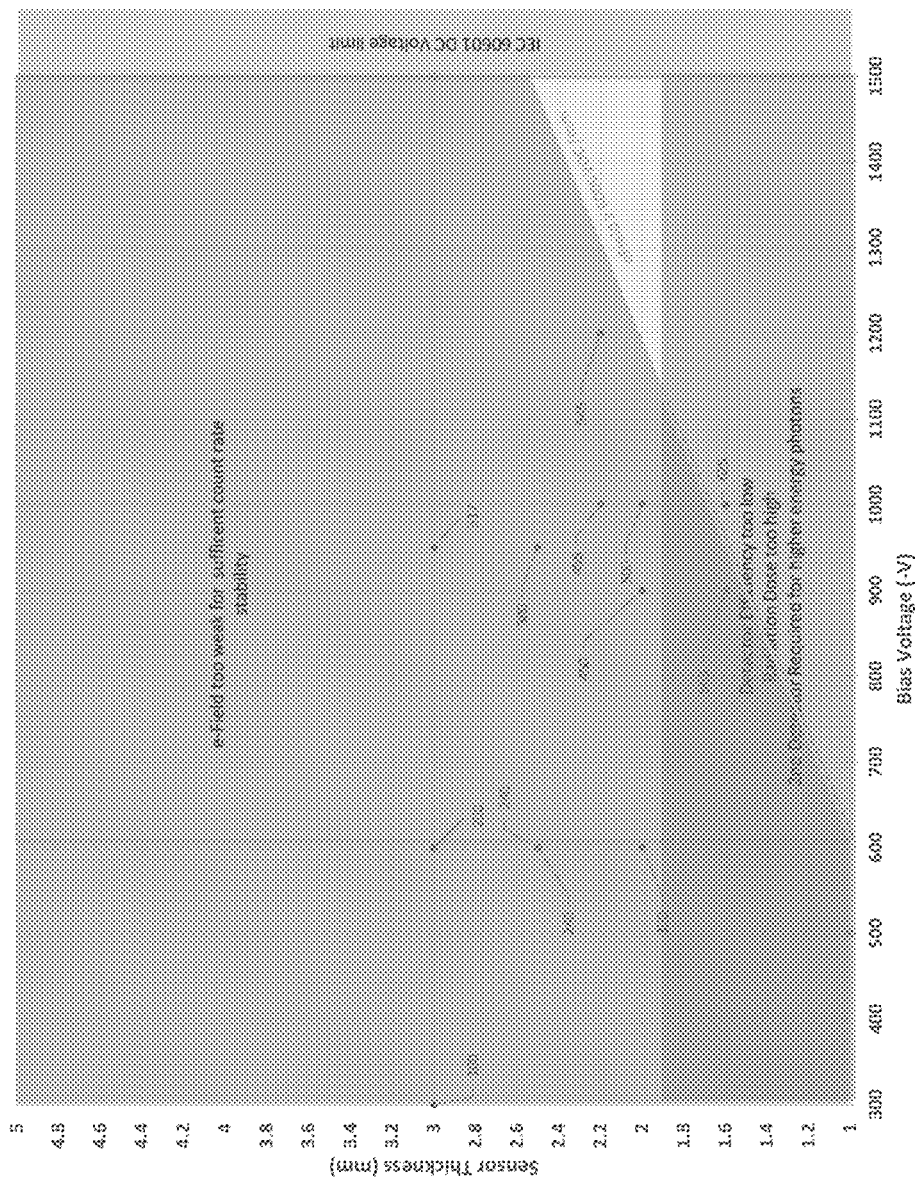

The present inventors have determined that the electric field in a semiconductor detector 120, such as a CdTe or CZT detector must be sufficiently high to achieve a high count rate stability. As shown in FIGS. 3A and 3B, the electric field should be at least 550 VDC/mm, and preferably at least 600 VDC/mm, such as 550 VDC/mm to 789.4 VDC/mm, such as 600 VDC/mm to 789.4 VDC/mm, including 600 VDC/mm to 780 VDC/mm to achieve a high count rate stability. The absolute value of the voltages are used to determine the electric field ranges.

The 550 VDC/mm and 600 VDC/mm electric field strength thresholds are shown as respective iso-electric field strength lines in the detector 120 semiconductor material plate 124 thickness versus applied bias voltage plots of FIGS. 3A and 3B, respectively. The preferred electric field, applied voltage and detector 120 semiconductor material plate 124 thicknesses are shown in the triangular region on the right side of FIGS. 3A and 3B. This narrows the available space for a well-functioning, stable PCCT detector to only the small triangular region.

For optimal detection efficiency, count rate performance, and count rate stability, a Photon Counting CT semiconductor (e.g., CdTe or CZT) detector 120 should have a semiconductor material plate 124 thickness of at least 1.9 mm CZT sensor thickness, and an applied bias voltage sufficiently high to generate an electric field of greater than or equal to absolute value of 550 VDC per millimeter of sensor semiconductor material plate 124 thickness (but not more than 1,500 VDC to ensure PCCT system compliance with IEC60601).

Specifically, for electric fields of at least 550 VDC/mm, the semiconductor detector 120 semiconductor material plate 124 thickness range is from 1.9 mm to less than 2.8 mm, such as 1.9 mm to 2.75 mm, and the applied voltage range is from 1050 VDC to 1500 VDC, such as 1050 to 1400 VDC absolute value. For electric fields of at least 600 VDC/mm, the semiconductor detector 120 semiconductor material plate 124 thickness range is from 1.9 mm to 2.5 mm, such as 1.9 mm to 2.45 mm, and the applied voltage range is from 1140 VDC to 1500 VDC, such as 1140 to 1400 VDC absolute value.

In contrast, the electric field in prior art semiconductor detectors is insufficiently high to achieve a sufficiently high count rate stability, even though the electric fields are sufficiently high to deliver sufficient count rate performance and avoid polarization and ballistic deficit. The present inventors are aware of several prior art PCCT systems in which the electric field is below 550 VDC/mm. These prior art systems are shown by circles in FIGS. 3A and 3B outside the triangular region. The value of the electric field is shown for each circle. The circle at 545 VDC at a detector semiconductor material plate thickness of 2.2 mm represents a use of a CZT detector 120 made by the assignee of the present invention in a PCCT system.

Stability of a PCCT detector 120 can be measured in a number of ways. One measurement is to calculate the average count rate "A" during the initial first number N1 of milliseconds (e.g., 20 to 300 ms, such as 50 to 100 ms) of a 1 second exposure period, and compare it to the average count rate "B" in the last, larger number N2 of milliseconds (e.g., 50 to 400 ms, such as 100 to 300 ms) of the exposure period. Thus, the count rate stability, CRS, equals to (A−B)/B (i.e., CRS=(A−B)/B).

Figure 4:
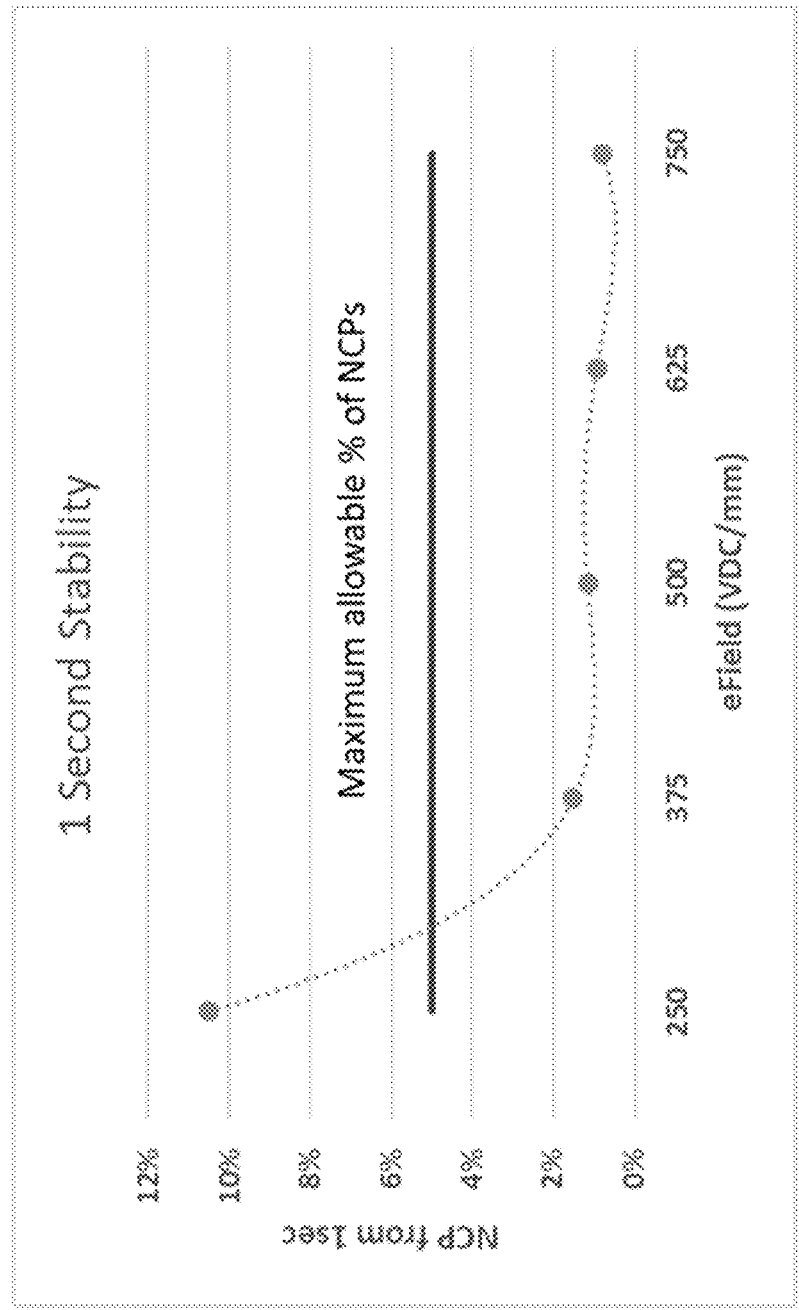
FIG. 4 is a plot of percent non-conforming pixels versus electric field for 1 second stability determination, according to various embodiments of the present disclosure.

In FIG. 4, any pixel 126 where the CRS is more than 2% is considered a Non-Conforming Pixel (NCP). For a minimally functioning detector, the percent of NCPs for 1 second stability should be less than 5% of the total pixels 126 in the detector. However, for a high quality commercial detector, the percent of NCPs for 1 second stability should be less than 1% of the total pixels 126 in the detector. As shown in FIG. 4, for an electric field of 500 VDC/mm, the percent of NCPs is 1.1%, which is above the 1% threshold. In contrast, for electric fields of 625 and 750 VDC/mm, the percent of NCPs is 0.9% and 0.8% respectively, which is below the 1% threshold.

Figure 5:
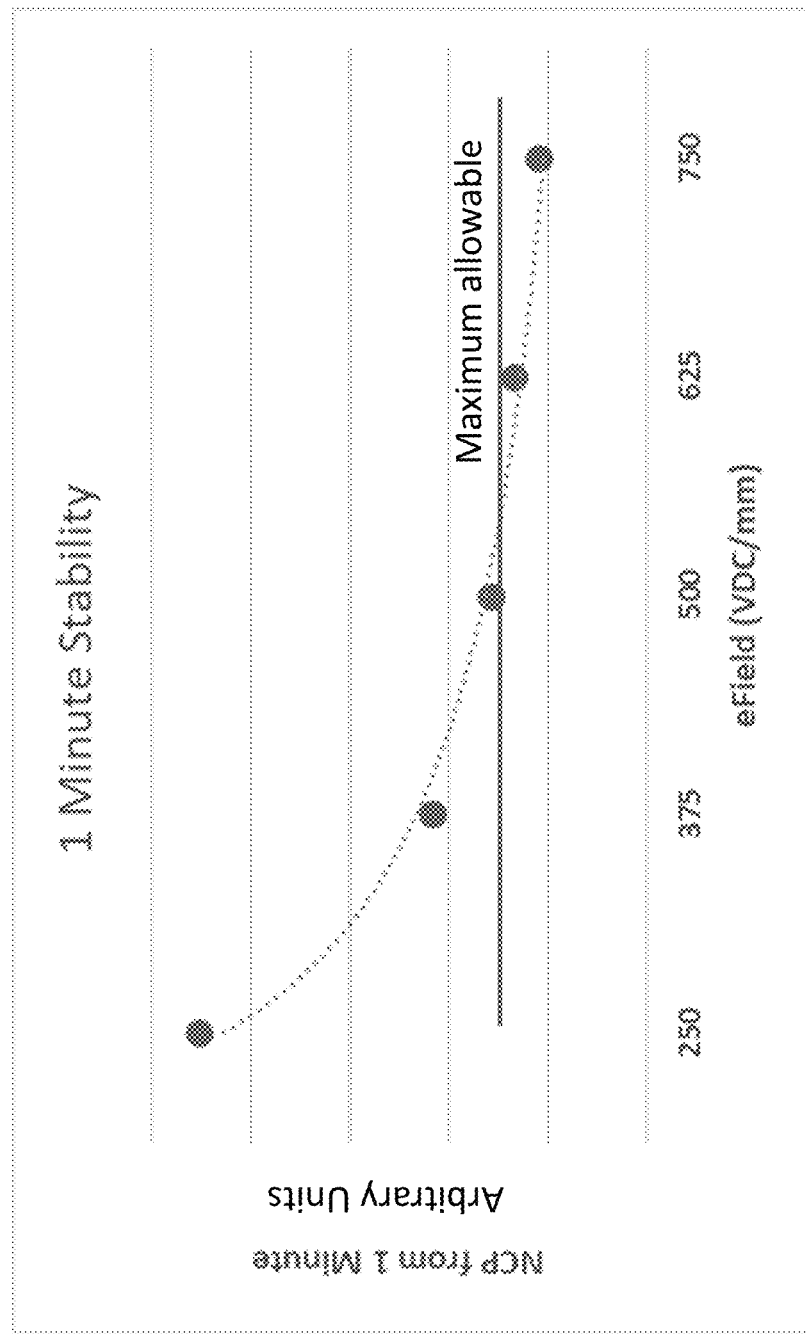
FIG. 5 is a plot of number of non-conforming pixels versus electric field for 1 minute stability determination, according to various embodiments of the present disclosure.

Another measure of PCCT detector stability is conducted over 1 minute and is calculated by comparing the average count rate "A" from the first N1 second (e.g., 5 to 20 seconds, such as 10 to 15 seconds) period to the average count rate "B" from the last N2 second (e.g., 5 to 20 seconds, such as 10 to 15 seconds) period in a 1-minute run. Any pixel 126 where the CRS is greater than 2% is considered an NCP. In some embodiments, the percent of NCPs for 1 minute stability should be less than a predetermined number (e.g., maximum allowable number) of the total pixels in the detector. As shown in FIG. 5, for an electric field of 500 VDC/mm, the percent of NCPs may be greater than the percent NCPs for electric fields of 625 and 750 VDC/mm. In some embodiments, the maximum allowable number of NCPs may be a value between the number obtained for the electric field of 500 VDC/mm and the number obtained for the electric fields at 625 and 750 VDC/mm, as shown in FIG. 5.

The detector 120 of embodiments of the present disclosure provides an improvement over the prior art PCCT detectors because it has a lower cost and uses a reduced X-ray radiation dose for the same diagnostic efficacy.

According to one embodiment illustrated in FIG. 1, an X-ray radiation detector 120 includes a semiconductor material plate 124, at least one cathode 122 located on a first side of the semiconductor material plate, and at least one anode 128 located on a second side of the semiconductor material plate. The semiconductor material plate 124 thickness is at least 1.9 mm. The X-ray radiation detector 120 is configured to operate at an absolute value of applied bias voltage of 1050 VDC to 1500 VDC, such that an electric field of at least 550 VDC/mm is generated in the semiconductor material plate 124.

According to another embodiment illustrated in FIG. 1, a photon counting computed tomography imaging system 100 contains an X-ray source 110 and an X-ray radiation detector 120 which comprises a semiconductor material plate 124 having a thickness of at least 1.9 mm, at least one cathode 122 located on a first side of the semiconductor material plate, and at least one anode 128 located on a second side of the semiconductor material plate. The method of operating the system 100 comprises applying an absolute value of applied bias voltage of 1050 VDC to 1500 VDC to the X-ray radiation detector 120, such that an electric field of at least 550 VDC/mm is generated in the semiconductor material plate 124.

In one embodiment, the semiconductor material plate 124 comprises a cadmium zinc telluride semiconductor material plate, and the X-ray radiation detector 120 comprises a photon counting computed tomography detector.

In one embodiment of FIG. 3A, the semiconductor material plate 124 thickness is 1.9 mm to less than 2.8 mm. In another embodiment of FIG. 3B the X-ray radiation detector 120 is configured to operate at an absolute value of applied bias voltage of 1140 VDC to 1500 VDC, such that an electric field of at least 600 VDC/mm is generated in the semiconductor material plate 124, and the semiconductor material plate thickness is 1.9 mm to 2.5 mm.

In one embodiment, the at least one anode 128 comprises a plurality of anodes, the X-ray radiation detector comprises a plurality of detector pixels 126, and each detector pixel contains one anode of the plurality of anodes 128. In the embodiment of FIG. 4, less than 1% of the total pixels 126 in the X-ray radiation detector 120 comprise non-conforming pixels in which a one second count rate stability exceeds 2%. In the embodiment of FIG. 5, the number of non-conforming pixels at an electric field of 550 VDC/mm and greater (such as 600 VDC/mm, for example 625 to 750 VDC/mm) is less than the number of non-conforming pixels at an electric field of 500 VDC/mm or less in which a one minute count rate stability exceeds 2%.

In one embodiment, the photon counting computed tomography imaging system 100 comprises the X-ray radiation detector 100, an X-ray source 110, and a means for applying the voltage of 1050 VDC to 1500 VDC from the high voltage bias power supply to the X-ray radiation detector 120, such that the electric field of at least 550 VDC/mm is generated in the semiconductor material plate 124. The means for applying may include a high voltage bias power supply 130 and a control unit 170 configured to apply the voltage of 1050 VDC to 1500 VDC from the high voltage bias power supply 130 to the X-ray radiation detector 120, such that the electric field of at least 550 VDC/mm is generated in the semiconductor material plate 124.

In one embodiment, the method of operating the system 100 includes passing X-ray radiation beam 135 through an object 10 and detecting X-ray radiation that passed through the object 10 at the X-ray radiation detector 120. In one embodiment, applying the absolute value of applied bias voltage of 1050 VDC to 1500 VDC to the X-ray radiation detector 120 comprises applying a bias voltage of 1050 VDC to 1500 VDC to the at least one cathode 122.

Figure 6:
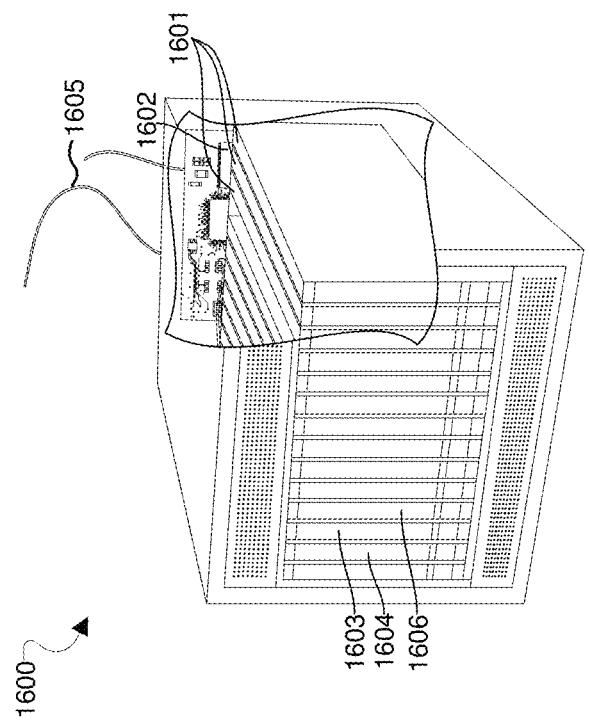
FIG. 6 is a component block diagram illustrating an exemplary integrated computing device and control unit suitable for use with the various embodiments of the CT imaging system.

The various computing devices 160 and/or control units 170 of the CT imaging system 100 of the embodiments of the present disclosure may be implemented in computing systems, such as any of a variety of commercially available computers 1600 as illustrated in FIG. 6. Such a computer 1600 typically includes one or more processors 1601 coupled to volatile memory 1602 and a large capacity nonvolatile memory, such as a disk drive 1604. As illustrated in FIG. 6, one or more processors 1601 may be added to the computer 1600 by inserting them into the racks of the assembly. The computer 1600 may also include a floppy disc drive, compact disc (CD) or digital versatile disc (DVD) disc drive 1606 coupled to the one or more processors 1601. The computer 1600 may also include network access ports 1603 coupled to the one or more processors 1601 for establishing network interface connections with a network 1605, such as a local area network coupled to other computers and servers, or the Internet.

The present embodiments may be implemented in systems used for medical imaging, such as CT imaging, as well as for non-medical imaging applications, such as industrial inspection applications.

Computer program code or executable instructions for execution on a programmable processor for carrying out operations of the various embodiments may be written in a high level programming language such as C, C++, C #, Smalltalk, Java, JavaScript, Visual Basic, a Structured Query Language (e.g., Transact-SQL), Perl, or in various other programming languages. Embodiments may be implemented as program code or processor-executable instructions stored on a non-transitory processor-readable storage medium that are configured to cause a processor coupled to a pixelated radiation detector, such as a processor or analysis unit of an X-ray imaging system, to perform operations of any of the various embodiments. Program code or processor-executable instructions stored on a non-transitory processor readable storage medium as used in this application may refer to machine language code (such as object code) whose format is understandable by a processor. Non-transitory processor-readable storage medium include any form of media used for storing program code or processor-executable instructions including, for example, RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a processor or computer.

While the disclosure has been described in terms of specific embodiments, it is evident in view of the foregoing description that numerous alternatives, modifications and variations will be apparent to those skilled in the art. Each of the embodiments described herein may be implemented individually or in combination with any other embodiment unless expressly stated otherwise or clearly incompatible. Accordingly, the disclosure is intended to encompass all such alternatives, modifications and variations which fall within the scope and spirit of the disclosure and the following claims.

What is claimed is:

1. An X-ray radiation detector, comprising:
   a semiconductor material plate;
   at least one cathode located on a first side of the semiconductor material plate; and
   at least one anode located on a second side of the semiconductor material plate, wherein:
   the semiconductor material plate thickness is at least 1.9 mm and less than 2.8 mm; and
   the X-ray radiation detector is configured to operate at an absolute value of applied bias voltage of 1050 VDC to 1500 VDC, such that an average electric field of at least 550 VDC/mm and up to 790 VDC/mm is generated in the semiconductor material plate.

2. The X-ray radiation detector of claim 1, wherein the semiconductor material plate comprises a cadmium zinc telluride semiconductor material plate and the X-ray radiation detector comprises a photon counting computed tomography detector.

3. The X-ray radiation detector of claim 2, wherein the X-ray radiation detector is configured to operate at an absolute value of applied bias voltage of 1140 VDC to 1500 VDC, such that an average electric field of at least 600 VDC/mm is generated in the semiconductor material plate.

4. The X-ray radiation detector of claim 3, wherein the semiconductor material plate thickness is 1.9 mm to 2.5 mm.

5. The X-ray radiation detector of claim 2, wherein:
the at least one anode comprises a plurality of anodes;
the X-ray radiation detector comprises a plurality of detector pixels; and
each detector pixel contains one anode of the plurality of anodes.

6. The X-ray radiation detector of claim 5, wherein less than 1% of the total pixels in the X-ray radiation detector comprise non-conforming pixels in which a one second count rate stability exceeds 2%.

7. The X-ray radiation detector of claim 5, wherein a number of non-conforming pixels at the electric field of at least 550 VDC/mm is less than a number of non-conforming pixels at an electric field of 500 VDC/mm or less in which a one minute count rate stability exceeds 2%.

8. A photon counting computed tomography imaging system, comprising:
the X-ray radiation detector of claim 2;
an X-ray source;
a high voltage bias power supply; and
a control unit configured to apply the voltage of 1050 VDC to 1500 VDC from the high voltage bias power supply to the X-ray radiation detector, such that the average electric field of at least 550 VDC/mm is generated in the semiconductor material plate.

9. A method of operating a photon counting computed tomography imaging system containing an X-ray source and an X-ray radiation detector which comprises a semiconductor material plate having a thickness of at least 1.9 mm and less than 2.8 mm, at least one cathode located on a first side of the semiconductor material plate, at least one anode located on a second side of the semiconductor material plate, the method comprising:
applying an absolute value of applied bias voltage of 1050 VDC to 1500 VDC to the X-ray radiation detector, such that an average electric field of at least 550 VDC/mm and up to 790 VDC/mm is generated in the semiconductor material plate.

10. The method of claim 9, wherein the semiconductor material plate comprises a cadmium zinc telluride semiconductor material plate and the X-ray radiation detector comprises a photon counting computed tomography detector.

11. The method of claim 10, comprising applying an absolute value of applied bias voltage of 1140 VDC to 1500 VDC, such that an average electric field of at least 600 VDC/mm is generated in the semiconductor material plate.

12. The method of claim 11, wherein the semiconductor material plate thickness is 1.9 mm to 2.5 mm.

13. The method of claim 10, wherein:
the at least one anode comprises a plurality of anodes;
the X-ray radiation detector comprises a plurality of detector pixels; and
each detector pixel contains one anode of the plurality of anodes.

14. The method of claim 13, wherein less than 1% of the total pixels in the X-ray radiation detector comprise non-conforming pixels in which a one second count rate stability exceeds 2%.

15. The method of claim 13, wherein a number of non-conforming pixels at the electric field of at least 550 VDC/mm is less than a number of non-conforming pixels at an electric field of 500 VDC/mm or less in which a one minute count rate stability exceeds 2%.

16. The method of claim 9, further comprising:
passing an X-ray radiation beam through an object; and
detecting X-ray radiation that passed through the object at the X-ray radiation detector.

17. The method of claim 9, wherein applying the absolute value of applied bias voltage of 1050 VDC to 1500 VDC to the X-ray radiation detector comprises applying a bias voltage of 1050 VDC to 1500 VDC to the at least one cathode.

* * * * *